UNITED STATES PATENT OFFICE.

EMIL A. JOHNSON, OF RUBY, WASHINGTON.

MATERIAL FOR POULTRY-NESTS.

1,359,602. Specification of Letters Patent. Patented Nov. 23, 1920.

No Drawing. Application filed March 4, 1920. Serial No. 363,347.

*To all whom it may concern:*

Be it known that I, EMIL A. JOHNSON, a citizen of the United States, residing at Ruby, in the county of Pend Oreille and State of Washington, have invented certain new and useful Improvements in Material for Poultry-Nests, of which the following is a specification.

The present invention relates to an improved article of manufacture designed as material for poultry nests, the primary purpose of the invention being the provision of an anti-vermin material especially adapted for use in the formation or manufacture of nests for fowls, poultry and other domestic animals, and produced from natural wood fiber.

In actual experience and practice I have discovered that the wood fiber of a cedar tree can be prepared and fashioned into material from which the nest may be made, and that the wood of the cedar tree possesses wood oil that is efficacious in the eradication and elimination of parasites, and in repelling mice, lice, insects and other objectionable and dangerous vermin common to domestic fowls and poultry.

In the following specification and claims I have set forth one complete example of the physical embodiment of my invention, carried out to produce the material in the best manner I have so far devised for the practical application of the principles of my invention, and while this example is complete and now deemed to be satisfactory, it will be understood that colorable changes and alterations may be made within the scope of my claims without departing from the spirit of my invention.

In the preferred form of my invention for producing the nest material I may use the waste material from the making of cedar poles from such trees, as it is well known that when the bark is stripped from these trees the bark material is usually waste.

Thus after stripping the bark, from a cedar tree I take the inner fibrous portion of the bark and tear it or cut it into shreds or comparatively long fibers of approximately the size of straw which is generally used in the making of poultry nests. This fiber, when dried, or partially dried, still retains the oil from the wood of the tree and the aroma clings to the fiber, thus maintaining the fiber in its natural and original condition so far as relates to the oil from the wood of the tree. Shredded fiber thus produced resembles somewhat the usual form of "excelsior" or shredded wood, and this shredded fiber is designed to form the foundation or base of the material from which the nest is to be built.

To a given quantity of this shredded inner bark of the cedar tree is added a quantity of chip bark from the outer bark of the tree, which chips also are impregnated with the cedar oil in its natural state, and these chips are utilized as ties or fillers for the fibrous material.

Yet another product of the cedar tree is added to the thus described material in the form of buds from the cedar tree, which buds are well known to be rich in the possession of cedar oil.

In preparing the material as an article of manufacture the following process may be carried out, but it will be understood that changes therein may be made at the will of the producer.

After the comparatively long shreds of fibrous bark have been bunched, the bark chips are interspersed throughout the mass of fiber and enmeshed therein, and the cedar buds are likewise embedded in the bunch of fiber, preferably within the interior of the bunch of fibers to prevent their loss. The material is thus put up in bunches, as for instance one bunch of a size and proportion to form or be formed into a nest for the poultry, and these bunches may be packed or placed in packages singly, by the half dozen or by the dozen as required. The bunches of material may be wrapped in envelops or wrappers to preserve the aroma and prevent exposure to the atmosphere until required thus retaining the oils for use in the performance of the functions of the material as a nest.

In use the material may be used in many branches of animal husbandry, but is particularly adaptable for making nests, or lining of nests, for domestic fowls, poultry, &c, and the resiliency of the dry fibers or shreds renders the material especially comfortable and convenient for this purpose. The material may be manipulated with facility in forming the nest, or forming a lining for a nest, and presents a smooth and soft seat or support for the fowl.

The inherent cedar oil in the nest material acts as a repellent to prevent gathering of parasites and repels mice and insects, and if the fowls have previously been infested with the parasites the cedar oil will quickly and effectively drive away the vermin and maintain the fowl in a cleanly state. The material is comparatively inexpensive of production and the nest or nest lining may be replenished or refurnished, when required, at only a slight cost in material.

As an example of a preferred form or embodiment of my invention, I have found it desirable to utilize the material in approximately the following proportions— about 60 per cent. shredded curled inner bark, about 25% outer bark and about 15% cedar buds to make up the bulk of the material. These proportions may of course be changed, or departures made therefrom in the preparation of the bundles or packages of material.

What I claim is—

1. A nest material comprising shredded fiber from the inner bark of a cedar tree, similar fiber from the outer bark, and buds from said tree combined as described.

2. A nest material made of comparatively long, shredded and dried fibers of the inner bark of a cedar tree, chips from the outer bark of a cedar tree interwoven therein, and a quantity of cedar buds embedded in the material as described.

3. A nest material made up in the form of a bunch of shredded and curled fibers rich in oil from the inner bark of a cedar tree, chips from the outer bark of the cedar tree interwoven therein and rich in cedar oil, and a quantity of cedar buds, also rich in oil, embedded in the bunch of material, for the purpose described.

In testimony whereof I affix my signature.

EMIL A. JOHNSON.